United States Patent
Duggan

(10) Patent No.: US 9,805,400 B2
(45) Date of Patent: Oct. 31, 2017

(54) DOWNLOADING DIFFERENT VERSIONS OF MEDIA FILES BASED ON A TYPE OF DOWNLOAD LINK

(75) Inventor: Tom Duggan, Vancouver (CA)

(73) Assignee: Nokia Technologies Oy, Espoo (FI)

( * ) Notice: Subject to any disclaimer, the term of this patent is extended or adjusted under 35 U.S.C. 154(b) by 2323 days.

(21) Appl. No.: 10/792,547

(22) Filed: Mar. 2, 2004

(65) Prior Publication Data

US 2005/0197964 A1 Sep. 8, 2005

(51) Int. Cl.
  G06Q 20/00 (2012.01)
  G06Q 30/06 (2012.01)

(52) U.S. Cl.
  CPC .................................. G06Q 30/06 (2013.01)

(58) Field of Classification Search
  USPC ...................................................... 705/50–80
  See application file for complete search history.

(56) References Cited

U.S. PATENT DOCUMENTS

| | | | |
|---|---|---|---|
| 5,996,022 A * | 11/1999 | Krueger et al. | 709/247 |
| 6,017,157 A * | 1/2000 | Garfinkle et al. | 396/639 |
| 6,278,466 B1 * | 8/2001 | Chen | 345/473 |
| 6,298,385 B1 * | 10/2001 | Sparks et al. | 709/233 |
| 6,321,231 B1 * | 11/2001 | Jebens | H04N 1/00132 |
| 6,366,899 B1 * | 4/2002 | Kernz | 707/1 |
| 6,395,969 B1 * | 5/2002 | Fuhrer | 84/477 R |
| 6,577,311 B1 * | 6/2003 | Crosby et al. | 345/428 |
| 6,601,009 B2 * | 7/2003 | Florschuetz | 702/124 |
| 6,640,232 B2 * | 10/2003 | Kernz | 707/104.1 |
| 6,643,666 B1 * | 11/2003 | Kernz | 707/104.1 |
| 6,700,589 B1 * | 3/2004 | Canelones et al. | 345/660 |

(Continued)

FOREIGN PATENT DOCUMENTS

| | | |
|---|---|---|
| EP | 1 049 312 A2 | 11/2000 |
| EP | 1049312 A2 | 11/2000 |

(Continued)

OTHER PUBLICATIONS

Office Action for corresponding Chinese Patent Application No. 200580012777.9 dated Jul. 3, 2009, pp. 1-11.

(Continued)

Primary Examiner — John Hayes
Assistant Examiner — John M Winter
(74) Attorney, Agent, or Firm — Ditthavong & Steiner, P.C.

(57) ABSTRACT

A system and method of providing media files such as songs or video over a network includes a first and a second transaction, separated by distinct website visits. In the first transaction, a file provider receives a payment over a network link, selects a first codec is selected based on a type of network link, and downloads a first copy of a media file to a customer that is compressed with the first codec. The provider also promises to download during a second transaction an additional copy of the song. During that second transaction, that or another provider downloads the additional copy of the media file without receiving further payment from the customer. The additional copy is compressed with a second codec that optimizes for the link used in the second transaction. Preferably, the customer concludes with a smaller AAC+ file downloaded to a mobile station and a higher fidelity AAC LTP file downloaded to a PC.

19 Claims, 4 Drawing Sheets

(56) References Cited

U.S. PATENT DOCUMENTS

| | | | |
|---|---|---|---|
| 6,813,580 B2* | 11/2004 | Florschuetz | 702/124 |
| 6,850,248 B1* | 2/2005 | Crosby et al. | 345/619 |
| 6,870,547 B1* | 3/2005 | Crosby et al. | 345/619 |
| 7,418,406 B2* | 8/2008 | Liebenow | 705/56 |
| 2002/0002674 A1* | 1/2002 | Grimes et al. | 713/156 |
| 2002/0032905 A1* | 3/2002 | Sherr et al. | 725/38 |
| 2002/0071556 A1* | 6/2002 | Moskowitz et al. | 380/210 |
| 2002/0106081 A1 | 8/2002 | Yang | |
| 2003/0028490 A1 | 2/2003 | Miura et al. | |
| 2003/0093507 A1* | 5/2003 | Shapiro | 709/222 |
| 2004/0011190 A1 | 1/2004 | Kawashima | |

FOREIGN PATENT DOCUMENTS

| | | |
|---|---|---|
| EP | 1 229 457 A2 | 8/2002 |
| JP | 2002-269464 A | 9/2002 |
| JP | 2003-157334 A | 5/2003 |
| JP | 2003-24205 A | 8/2003 |
| JP | 2004-045706 A | 2/2004 |
| RU | 2 339 075 C2 | 11/2008 |
| WO | WO 03/003164 A2 | 1/2003 |
| WO | WO 03/013141 A1 | 2/2003 |

OTHER PUBLICATIONS

Chinese Office action for corresponding CN app. No. 200580012777.9 dated Aug. 2, 2010, pp. 1-11.
Office Action for corresponding Chinese Application No. 201110375106.6, dated Nov. 5, 2014, 12 pages (Partial English Translation and Summary Included).
Japanese Office Action for related Japanese Patent Application No. JP2007-501372 dated Apr. 1, 2010, pp. 1-9.
Japanese Office Action for related Japanese Patent Application No. JP2007-501372 dated Jan. 10, 2012, pp. 1-12.
Japanese Office Action for related Japanese Patent Application No. JP2007-501372 dated May 21, 2009, pp. 1-11.
First Examination Report of Indian Application No. 5722/DELNP/2006 dated May 28, 2013, pp. 1-3.
Chinese Office Action for related application No. 201110375106.6, issued Apr. 25, 2014, with English-language summary, 11 pages.
Chinese Office Action for related Chinese Patent Application No. 201110375106.6 dated May 4, 2015, with English-language summary, 11 pages.
European Office Action for corresponding EP Application No. 05 708 635.7-2201, dated Aug. 21, 2009, Europe.
"Encoding Recommendations for Mobile Devices", Encoding using Helix™ Mobile Producer 2.0 powered by Envivio, Real Networks, Version 2.0.2, Aug. 8, 2003, 7 pages.
Chinese Office Action dated Mar. 7, 2008.

* cited by examiner

DOWNLOADING DIFFERENT VERSIONS OF MEDIA FILES BASED ON A TYPE OF DOWNLOAD LINK

FIELD OF THE INVENTION

The present invention relates to downloading media files over network links, such as an air interface link and a wired internet link, where a first download is of one file type or version and authorizes the user to download a different file type or version of the same substantive file at a later time. Also, the present invention relates to securing rights to more than one copy of a digital media file within a single transaction over a network, wherein the various copies of the media file are provided over more than the one transaction over the network.

BACKGROUND

It is known to preserve and distribute music in various digital audio file formats. Though a retail customer may own a legally purchased physical embodiment of the digital music file, such as an optical CD or other computer storage media that holds a properly downloaded copy of the music, copyright law reserves to the owner of the copyright the right to make and distribute additional copies of the file. The owners of music copyrights have only recently allayed concerns over unauthorized copying and distribution over a network, and have now licensed content providers to copy and distribute digital versions of their copyrighted songs over the internet.

Due to the significantly larger size of digital media files that carry video content as opposed to only audio, the combination of file compression and bandwidth expansion necessary to electronically send video in less time than it takes to run or 'play' the video file at normal speed has only recently been achieved. With that technological barrier overcome, some business analysts expect that precedents set by the music industry will eventually be followed by the cinematic industry. For brevity, the above audio and video files are referred to as media files, and includes music, movies, video clips such as movie trailers and similar short advertisements, and the like. A copy of such a media file obtained via download from a network (with no accompanying transfer of storage media) is referred to as a virtual copy of the media file. Though the following discussion relates primarily to music files, the principles apply to any media files.

Virtual music is generally downloaded over the internet onto a personal computer. Retail customers often upload the music files stored on their PC to a portable digital music device, such as an iPod®. Portable digital music devices are relatively new consumer products, and consumers are generally satisfied with the memory volume available (now typically 10-40 gigabytes). As music downloads became more commonplace, many PC users were linked to the internet or local network via a dial-up modem and a standard telephone line. The need soon arose to compress music files so that transfers over a network would not occupy inordinate amounts of bandwidth. This also allowed portable music players to store more music, and greatly contributed to their quick adoption by the marketplace.

Digital music files are encoded and compressed using an algorithm (or lookup table) that is termed a codec (code/decode). Because the commercial transfer of compressed digital music is becoming ubiquitous, the value of the codec used to compress them has risen in value. Several different companies have introduced their own codec to capture some of that value, which can be achieved directly by licensing the codec or indirectly by providing such a critical mass of files requiring that codec as to drive users' choices of hardware. For example, MP3, AAC (Advanced Audio Coding, sometimes termed Mpeg-4 Audio) and AAC+ are each well-known codecs currently in use among the general public. Microsoft® has recently introduced a WMA codec to compete with MP3 by using approximately half the storage capacity for what some users have reported is equal or better sound quality. Where MP3 and AAC are optimized for playback at compression rates above 64 kbps, AAC+ is a codec optimized for playback at compression rates below 64 kbps. As a result, MP3 and AAC yield larger music files, whereas AAC+ yields smaller music files, all other factors being equal. Though AAC+ is optimized for lower compression rates, it is inferior (in playback quality) to codecs that produce larger files.

FIG. 1 is a diagram showing relative audio quality or fidelity (vertical axis) for playback at various compression rates (horizontal axis) for different codecs. The lower portion of the shaded regions representing each codec shows worst-case performance, which for AAC LC and AAC LTP are in the range of the much older MP3 format. The MP3, AAC LC and AAC LTP codecs each provide increased fidelity with increased compression rates, whereas maximum fidelity for an AAC+ file is achieved at about 64 kbps compression.

It has been reported that many portable digital music players have the capability to play files using more than one codec but are precluded from doing so by digital rights management (DRM) software that works to preserve the proprietary nature and value of privately owned codecs noted above. Briefly, a file carrying a .MP3 extension, necessitated by the format in which it was downloaded, will be played by the portable digital music player only using the MP3 codec. While the music player might have the capacity to re-compress or other wise convert between .MP3 and, for example, AAC+, it is not authorized to do so absent some means to circumvent the DRM (which may be prohibited by the Digital Millenium Copyright Act). However, the inventor does not perceive that portable digital music need be limited to a dedicated device, as current DRM restrictions tend to do.

It is known to download from a network certain abbreviated music files, such as digital ringtones, that are intended for a mobile station. It is assumed that certain individuals download these ringtones directly to their mobile station when that mobile station includes a browser that accesses the internet via a mobile telephony air interface. The limited bandwidth of that air interface, combined with the limited storage capacity and power supply of a mobile station, make it impractical to provide downloads of larger music files (e.g., an entire two- or three-minute song) over a mobile telephony air interface using codecs designed for the data rates of cable modems and DSLs. Merely using a codec tailored to the environment of a mobile terminal (less storage, lower data throughput over the air interface) is not anticipated to meet the needs of most consumers for the following reason. It is anticipated that consumers will accept that a song played on a mobile terminal may offer only reduced fidelity as compared to a dedicated portable digital music player (e.g., iPod®), at least until certain technological obstacles are overcome. However, those same consumers are likely unwilling to accept that reduced song fidelity when the same song is played in devices that currently offer higher fidelity such as portable MP3 players.

What is needed in the art is a way to enable users to possess a digital music file that is optimized for different hardware platforms on which the music may be played.

SUMMARY OF THE INVENTION

The present invention provides in one aspect a method of doing business over a network such as the internet. This method is divided into two transactions, each defined by website visits. In the first transaction, the method includes providing a first version of a digital media file to a customer. The first version is compressed with a first codec. In the second transaction, the method includes providing a second version of the digital media file to the customer. The second version is identifiable from the first because it is compressed with a second codec, whereas the first is compressed with the first codec. However, the first and second versions retain the same underlying media file, such as the same digitized song. As perceived by a retail user, the first and second versions may exhibit differences in quality, but at least a portion of their substance is identical. Further according to this aspect of the method, during the first transaction, an authorization is granted to the customer for the second version of the digital media file. This authorization may be in the form of a digital ticket or such, and the second version may be provided by the same or by a different provider as compared to the first version. Most advantageously, the customer need only remit payment once, during the first transaction, to obtain rights to copies of both the first and the second version. Where the first and second versions are optimized for the type of network link (and thus the hardware platform using that link) used by the customer during the first and second transactions respectively, the customer preferably ends with two different versions of the same underlying media file, each version optimized for the hardware platform onto which the customer plays back the media file.

Another aspect of the present invention includes a method of operating a website. This method includes receiving from a customer over a network a payment authorization (such as authorization to charge a credit card) and a type of network link used by the customer. The type of network link may be manually submitted by the customer or presumed by the operator of the website based on an embedded digital signal that identifies the hardware being used by the customer (or the lack of such an embedded signal). The method follows with transferring to the customer a media file compressed with a first codec. Whereas the customer may select the particular underlying media file, the first codec is selected based on the type of network link. The customer is also provided with a download authorization to download the media file that may be compressed with a second codec. In certain variations of this method, the customer may use that authorization at the same or a separate website to obtain another copy of the media file. Where the link used to obtain the other copy of the media file differs in a significant way from the previously described link (especially wide differences in data rates supported by such a link), the second codec differs from the first codec so the customer ends with two different versions of the same underlying media file.

Yet another aspect of the present invention is a system to distribute music files over a network to a customer. The system includes a first server that is responsive to a customer's submission of a selected music file and a payment authorization over a first network link. For example, the customer may select a song file and a link type from a website hosted by the server, and submit his selection with a "send" button. The server then automatically selects a first copy of the selected music file based on a first network link type, such as the link type selected and submitted by the customer. The first copy of the selected music file is compressed with a first codec. The first server then operates to automatically download, over the first network link, the first copy of the selected music file. Computer readable instructions record an electronic promise to download a second copy of the music file selection without an additional payment authorization. As in any contract, a promise is merely an obligation, so any electronic recording that embodies an obligation to provide a second copy of the music file satisfies this portion of the invention. The electronic promise may be downloaded to the customer with the first copy (and embodied on the customer's electronic storage medium), as in a digital ticket. Or the electronic promise may be stored in a digital storage medium associated with the server, to be accessed by the customer or by a cooperating other server upon submission of a password or other such security feature. Preferably, a second server is responsive to a customer's request for the second copy of the selected music file over a second network link and receipt of the digital promise. The second server then selects the second copy of the selected music file based on a second network link type. The second copy is the selected music file compressed with a second codec. The second server may be the same as the first, as when the customer visits the first server on two separate occasions, or the first and second server may be different entities, as where the customer downloads the first copy form one website and the second copy form another website related to the first by an agreement to honor one another's promises to download.

These and other aspects of the present invention are more particularly described below.

BRIEF DESCRIPTION OF THE DRAWINGS

The present invention is best understood when the below description is considered in conjunction with the below-identified drawings. It is to be understood, however, that the drawings are designed solely for the purposes of illustration and not as a definition of the limits of the invention.

DETAILED DESCRIPTION

While the claimed invention is described below primarily with reference to digital music files, a practitioner in the art will recognize the principles of the claimed invention are applicable to other types of media files such as video and audio/video media files.

Figure 1:
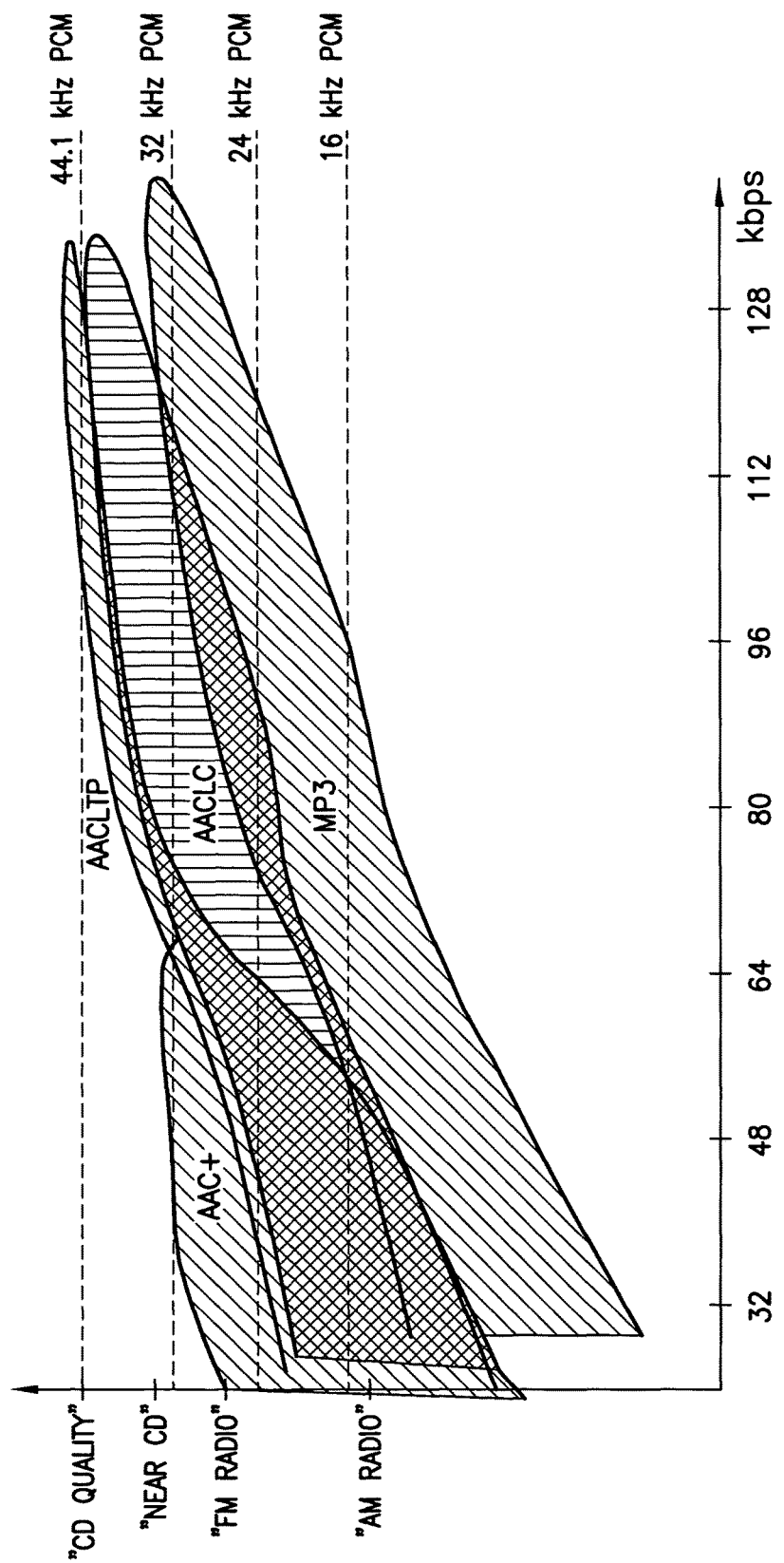
FIG. 1 is a graph of compression rate versus sound quality for various compression codecs currently used in the prior art.

As is illustrated in FIG. 1, files compressed according to the AAC+ codec are optimized for playback at around 64 kbps, and files compressed according to the AAC LC codec are optimized for playback above about 96 kbps. A media file compressed with AAC+ is smaller than that same file compressed with AAC LC, but will yield lesser quality. FIG.

1 graphs audio quality of music files, but the principle holds for video quality of video files.

Figure 2:
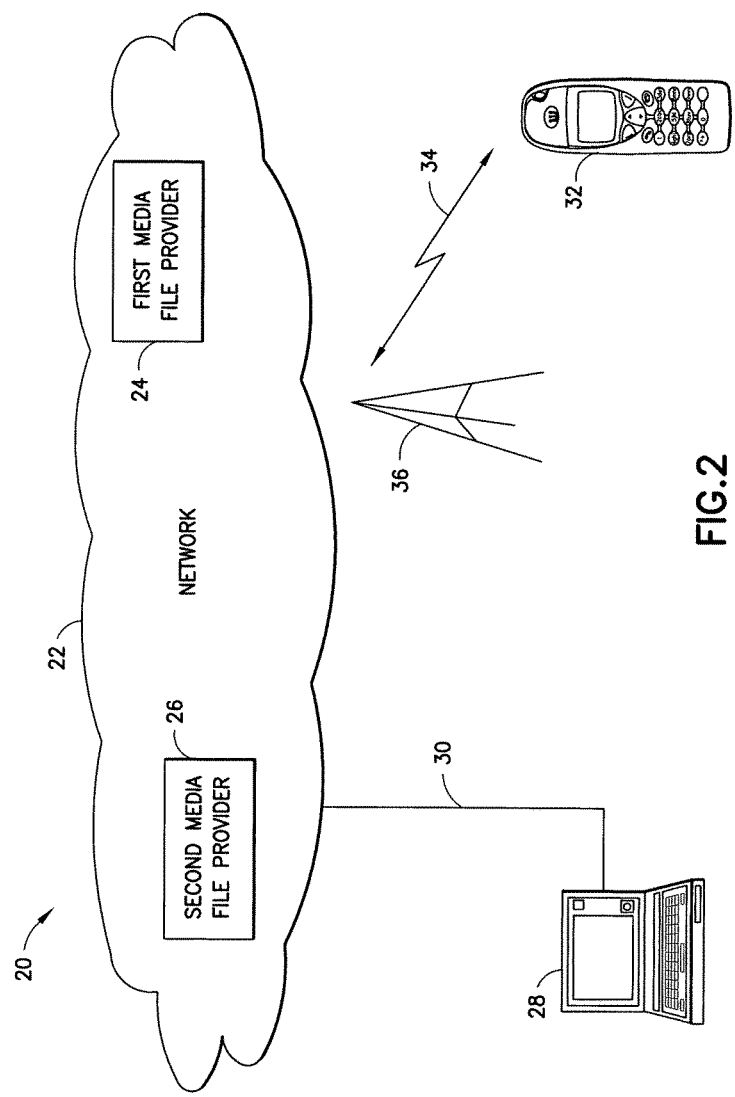
FIG. 2 is a block diagram of a preferred environment in which the present invention may be practiced.

FIG. 2 depicts an overview of a system 20 or environment in which the present invention may operate. A network 22 such as the internet includes a network server or media file provider 24, 26, such as at http://www.apple.com/itunes/ (valid as of Feb. 11, 2004). The provider 24, 26 maintains a database of digital media files for download over the network 22 to third parties, and the media files may be encoded using one or more codecs. Each digital media file encoded with a different codec constitutes a different version of the digital media file. Assume a digital file representing a particular song is termed a first version when encoded with AAC+ and termed a second version when encoded with AAC LTP. One media file provider 24 or 26 may make both first and second versions the digital media file (the particular song) available over the network 22, or a first provider 24 may make the first version available and a second provider 26 may make the second version available.

A personal computer PC 28 is coupled to the network 22 by a higher bandwidth link 30 such as a coaxial cable and cable modem or a digital subscriber line. A mobile station MS 32 is coupled to the network 22 by a lower bandwidth link 34 such as a mobile telephony air interface link to a radio tower 36. The radio tower 36 is preferably hardwired into the network 22. Each of the PC 28 and the MS 32 are distinct hardware platforms that access the network by a distinct type of link. Where a customer or user has access to the network 22 by both the PC/higher bandwidth link and the MS/lower bandwidth link, the present invention provides for two versions of a digital media file.

The two versions of the media file are identifiable by the different codecs used to compress the underlying media file. While an individual customer may choose to download both versions to the same hardware platform without departing from the broader aspects of the present invention, its advantages are best realized when the separate versions are downloaded to the separate platforms 28, 32 via the distinctly different links 30, 34. For example, a provider 24, 26 may allow a customer to download a first version of a media file compressed with the AAC+ codec when requested via a mobile telephony air interface link 34 during a first transaction. During a subsequent second transaction, the provider 24, 26 then allows the customer to download a second version of the media file compressed with the AAC LTP codec when the customer requests the file via a PC 28 using a higher bandwidth link 30. The first version is selected to minimize download time, due to the bandwidth constraints of the lower bandwidth link 34. The second version is selected to maximize fidelity (audio quality in music files), as bandwidth limits are not a major concern for the higher bandwidth link 30. Underlying the above is the assumption is that the second version of the media file is to be played on the PC or uploaded from the PC to a portable digital music player. Alternatively, the second version may be downloaded directly to a portable digital music player through a wireless local area network WLAN (once wireless portable digital music players become available).

Mobile telephony networks are limited in the rate at which they transfer data by the underlying network architecture (a network may support multiple architectures). GPRS networks have a theoretical maximum bit rate of 115 kbps, though it is reported that the practical maximum limit is nearer to 80 kbps and reliable streaming is likely limited to about 18-22 kbps in most cases. EDGE and UMTS networks have a theoretical maximum bit rate of 384 kbps, and reliable streaming is reportedly limited to a maximum of about 50 kbps in most cases. Mobile stations 32 can also limit the rate of data transfer, and not all codecs are supported by all mobile stations. Generally, conventional mobile phones 32 are limited to about 34-80 kbps, with PocketPC® and RealOne® players imposing a higher maximum of around 200 kbps. While this higher data rate may have practical value when downloading over a WLAN, when downloading over a mobile telephony link 34, the above summary indicates that data rates are generally limited by the mobile telephony network (to about 20-50 kbps) rather than by the mobile station 32. For downloads over a mobile telephony link 34 then, AAC+ is optimized among the codecs compared in FIG. 1 for that link 34.

It is an aspect of the invention that the customer obtains rights in both the first and second versions of the digital media file during a first transaction in which the customer downloads only the first version. During the first transaction, the customer accesses the media file provider 24, 26 through the network 22; requests a particular song (a digital media file); arranges payment to the media file provider 24, 26; and downloads the song (one version of the media file) to a hardware platform 28, 32. At a time subsequent to the first transaction, and at least after leaving the media file provider's site 24, 26 following the file download associated with the first transaction, the customer initiates a second transaction. The customer accesses the media file provider 24, 26 again, but this time preferably from a different hardware platform 28, 32. The customer requests the same song as in the first transaction, and downloads the song (a different version of the same media file) to the other hardware platform 28, 32 without the need to arrange payment during the second transaction.

Providing for a single payment for the two transactions encourages the customer to choose two versions to download for at least two reasons. First, the customer has the ability to purchase the song at any time and any place, limited only by the presence of a mobile link 34. Mobile links 34 are nearly universal everywhere that music purchases from a network 22 are not insignificant. This gives the customer the means to satisfy an impulse purchase, such as when first hearing a new song at a concert or over a car radio. Second, the customer is more likely to execute the first transaction when the two file versions are linked because that linking removes concerns that the customer will soon be dissatisfied with only a lower-quality music file. This is a concern where the first download is to the MS 32. Additionally, linking the two versions by a single payment mitigates completely losing a sale, as where the customer makes no purchase of the song from the media file provider 24, 26; and partially losing a sale, as where the customer purchases one but not both versions of the song due to higher transaction costs in loading payment information (name, address, credit card number, etc.) for each file version separately.

Preferably, the particular version of the media file, provided to the customer during either or both of the transactions, is selected based on the type of link 30, 34 between the customer and the provider 24, 26. This selection may be effected in various ways. The provider 24, 26 may include a pull-down menu from which the customer selects the type of link (e.g., mobile phone, dial-up/WLAN, broadband); or a direct choice between file versions (e.g., fast download, high quality). The provider 24, 26 may alternatively automatically detect the type of hardware used by the customer, and select the particular version of the file based on an assumption of the most likely type of link 30, 34 used by the hardware platform 28, 32 making the request. For example, every modern MS 34 carries a unique digital code that is embedded in at least some of its transmissions. This unique identifier is used by the mobile telephony network for signaling and billing purposes, but may be transferred to the broader internet so for use by website operators and media file providers. Specifically, a digital code that identifies the requesting hardware platform 28, 34 (at least by type, as in PC 28, MS 34, etc.) may be embedded in the customer's request for the song. The provider 24, 26 accesses that embedded digital code, determines that the requesting hardware platform is a MS 34 (for example), and selects an AAC+ version of the file based on the assumption that a download to an MS 34 will be over a mobile telephony link 34. Where the request does not include a code that identifies the requesting hardware as an MS 34, the provider may reasonably assume that a higher bandwidth link 30 is available and make the selection of file version (e.g., AAC LTP) based on that assumption.

During the first transaction wherein a first media file provider 24 provides the customer with the first version of the media file, the customer also gains authorization to a copy of the second version. The specific second version (e.g., AAC LP, AAC LTP) may not yet be determined at the time of the first transaction, as it may be dependent upon the type of link 30, 34 used for the second transaction. Regardless, the customer is authorized to a copy of some second version of the media file during the first transaction. The media file provider 24, 26 may provide the customer with some evidence of that authorization, such as a digital ticket or an access code or password that is provided during the first transaction. Preferably, that authorization identifies the media file and the first version. This eliminates the need for the customer to re-enter the name of the requested song during the second transaction, and prevents a customer obtaining two different media files (different underlying songs, not merely differently encoded versions of the same substantive media file or song) in the two transactions described.

Where the authorization is an access code or a password, the customer need only enter it at a provider's webpage when requesting the second version of the media file. It is anticipated that customers may find increasingly long passwords as overly burdensome when such passwords or access codes are manually entered. Therefore, a digital ticket that is electronically transferable from one hardware platform to another is preferred. This digital ticket operates like a user ID/password, but is entered automatically rather than manually entered by the customer digit-by-digit. For example, a media file provider 24, 26 may download, to a customer's MS 32 during the first transaction, a digital ticket along with a first version of the media file. That customer later accesses the provider of media files 24, 26 using a PC 28. With a Bluetooth® link, hardwired connection (e.g., cradle), or other coupling between the MS 32 and the PC 28 (such as are currently used for synchronizing contact lists and schedules, for example), the digital ticket is transferred to the PC 28. During the second transaction, the digital ticket is sent from the PC 28 via the link 30 to the provider of media files 24, 26, thereby evidencing authorization for a second version of the media file. The digital ticket may not specify which specific version, AAC LTP, AAC LC, etc., is to be provided, as that may be determined based on the link used in the second transaction. As used herein, a digital ticket includes any security code, associated with a transaction of the present invention, that is automatically downloaded to the customer in one transaction. As above, that same digital ticket may be later uploaded by the customer as proof of authorization or proof of payment.

Additional complexity arises where the first and second versions of the media file do not originate from a common provider of media files. The present invention includes different media file providers 24, 26 providing different versions of a media file to the same customer. This is advantageous to the customer, as he/she may prefer one provider 24 for downloads over a mobile telephony air interface 34, and another provider 26 for downloads over a higher-bandwidth link 30. The customer's preference may be based on download speed, ease of website use, etc. This aspect of the invention additionally enables smaller providers 24, 26, who may not have amassed multiple versions of each digital file, to participate in the commercial activity facilitated by the present invention. The digital ticket or password described above may be presented to the same provider of media files 24, 26 that provided the first version, or to a second provider 26 to prove authorization. Because payment is made only during the first transaction, and therefore only to the first provider 24, there must be some legal arrangement whereby the second provider 26 is assured payment for honoring the authorization (e.g., the digital ticket or password) provided to the customer by the first provider 24. This assurance may be in the form of a contractual relationship between the first 24 and second 26 providers, or some commonly accepted licensing scheme whereby participant are reimbursed from the total of related sales or collections based on relative market share, relative number of first and/or second versions downloaded to customers, or some similar market partitioning mechanism. Such a licensing scheme may not be in the form of a traditional contract, but rather may follow from a statutory licensing scheme or a broadly applicable royalty rate such as is common with copyrighted works. Where a license is involved, the license may be to a copy of the underlying work (e.g., the second version of the digital media file is a copy of the underlying song) or to a copy of a derivative work (e.g., a copy of the first version as modified into the second version).

Figure 3:
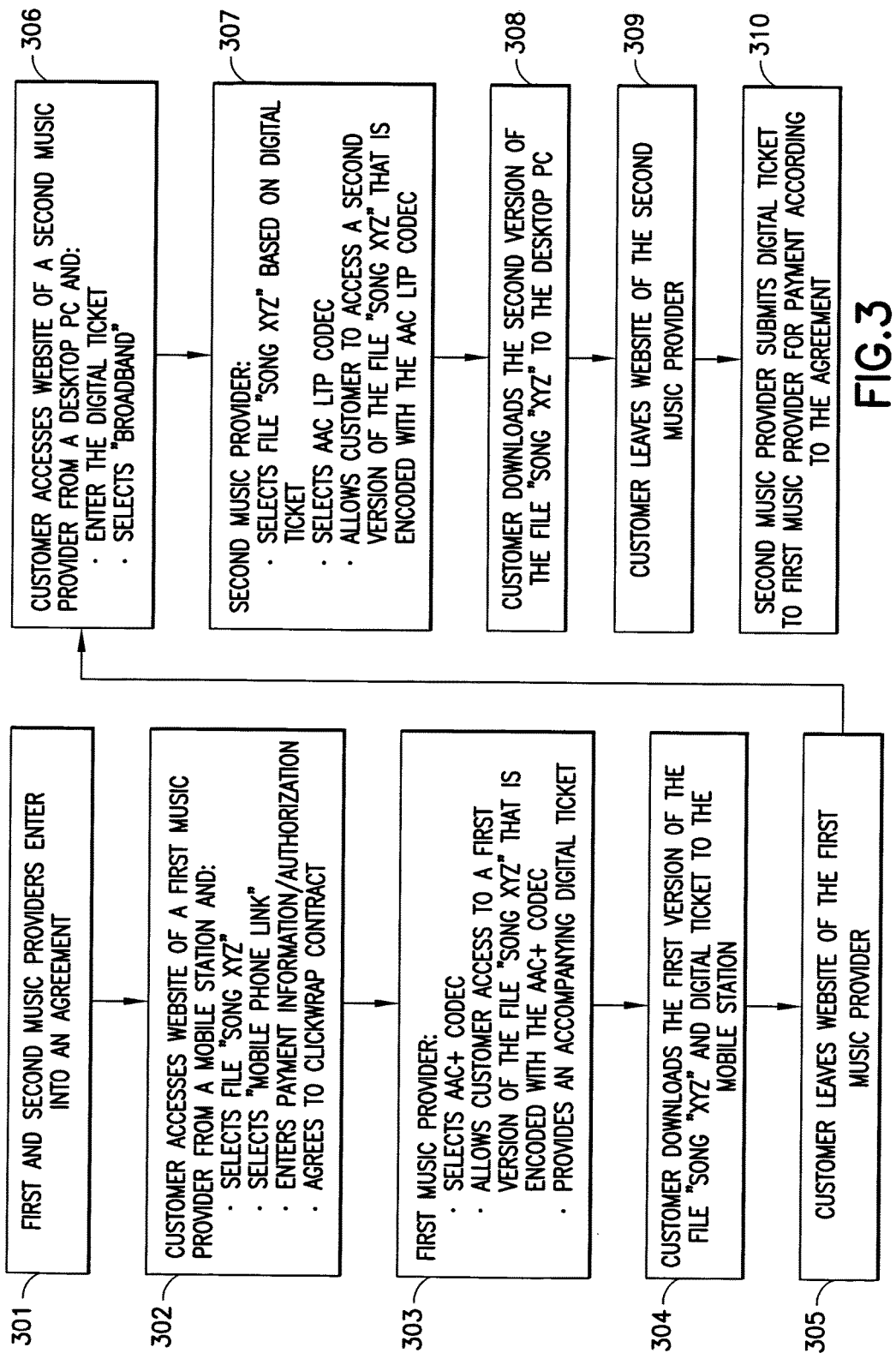
FIG. 3 is a flow diagram delineating steps of the method according to one embodiment of the present invention as employed for a music file.

FIG. 3 is a flow diagram describing various steps of the inventive method when two different media file providers supply the different versions of a music file to a customer. At block 301, the first and second music file providers enter into an agreement whereby the second music provider will honor digital tickets issued by the first, and the first will remit payment to the second upon presentation of the digital ticket. Preferably, the providers honor one another's digital tickets, and they agree to terms of a contract that binds customers who download music files from their sites. This contract with the customer is commonly termed a 'click wrap' contract or license, and is executed by a customer by clicking on an icon labeled "I agree" or similar language. A click wrap contract relevant to a download of music may include a customer's promise to pay, a limitation of the music provider's liability, a series of customer limitations as to sharing, copying, and transferring the downloaded music, and various legal formalities such as choice of law, venue, and arbitration.

A customer later uses a mobile station with internet capability to access a website of the first music provider at block 302, and selects a file ("song xyz") that he/she wishes to download. The customer then elects from a drop down list that he/she is accessing the website using a mobile phone link, enters payment information and authorization (credit card, Paypal™, etc.), and agrees to a click wrap contract with the first music provider. In response at block 303, the first music provider selects the codec AAC+ as that codec for optimizing downloads over a mobile telephony link. The file "song xyz" that is encoded with the AAC+ codec is referred to as the first version of the file, and the first music provider allows the customer to download that first version. The first music provider also provides a digital ticket to be downloaded to the customer with the first version of the file.

At block 304, the customer downloads the first version of the file "song xyz", which may be initialized by the first music provider or by the customer via a "download" or similar icon at the website of the first music provider. The digital ticket is downloaded with the first version of the file. The customer leaves the website of the first music provider at block 305, signaling the end of the first transaction which encompasses blocks 302-304.

Some time later, such as the following day when the customer is at home, the customer uses his/her desktop personal computer to access the website of a second music provider at block 306. Using a Bluetooth® connection between the mobile station and the PC, the customer submits the digital ticket received at block 304 to the second music provider, and elects from a drop down list that he/she is accessing the website using a broadband link. Though not illustrated in FIG. 3, preferably the second music provider confirms that the submitted digital ticket is valid, such as by comparing to a list of outstanding digital tickets mad available by the first music provider, or by requesting the first music provider confirm that the submitted digital ticket has not yet been presented. The following steps (except block 309) are predicated on the digital ticket being valid where a validation step is included. In response at block 307, the second music provider reads the digital ticket and identifies the particular song xyz or underlying master file from it. The second music provider selects the codec AAC LTP as that codec for optimizing downloads over a broadband link. The file "song xyz" that is encoded with the AAC LTP codec is referred to as the second version of the file, and the second music provider allows the customer to download that second version. Where the agreement of block 301 included the terms of a customer click wrap contract, the second music provider need not require the customer to enter into another click wrap contract, as the first one at block 302 preferably contains protections sought by the second music provider even if the second provider is not explicitly named in the click wrap contract of block 302. Alternatively, the second music provider may require customer execution of a separate click wrap contract.

The customer then downloads the second version of the file "song xyz" at block 308, which may be initialized by either the second music provider or the customer as noted above. Though not illustrated in FIG. 3, preferably the second music provider notifies the first music provider that the specific digital ticket has been honored, and the first music provider removes it from a database of outstanding digital tickets or annotates the list as the particular ticket having been presented and honored. The customer leaves the website of the second music provider at block 309, signaling the end of the second transaction which encompasses blocks 306-308.

The second music provider submits the digital ticket to the first music provider for payment according to the agreement of block 301. This presenting may or may not be simultaneous with the validation of the digital ticket noted above. The second music provider may present the digital ticket to the first music provider during the customer's second transaction wherein the customer obtains the second version of the file (between blocks 306 and 308), or afterwards.

The present invention is most immediately advantageous as executed with digitized files of popular music as in the description above, such as songs typically defining about three minutes in length and nearly always exceeding two minutes in length when played at the normal intended speed. It may also be employed for video clips that a customer may wish to preview on his/her MS 32 and view with greater resolution on his/her PC.

Figure 4:
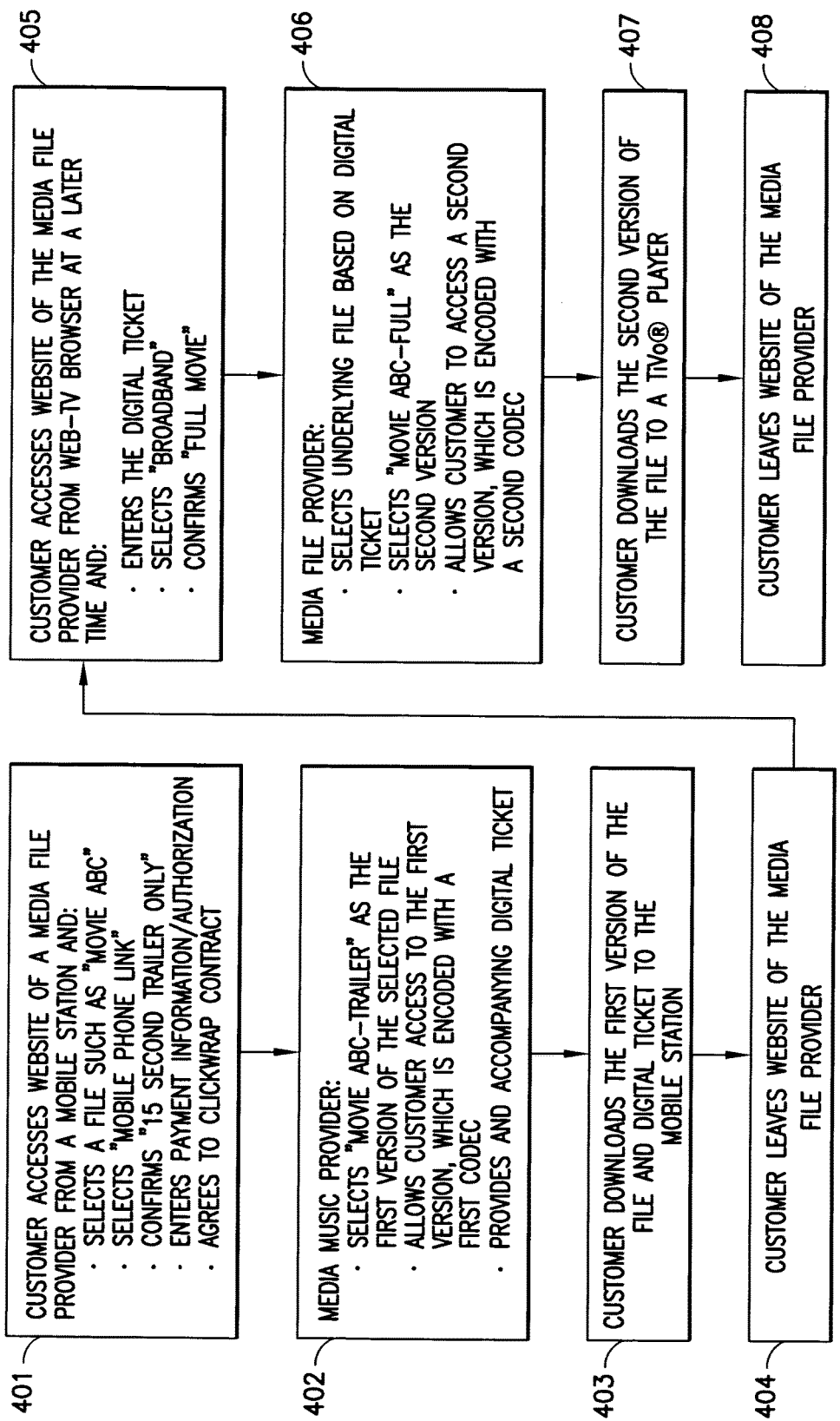
FIG. 4 is a flow diagram delineating steps of the method according to another embodiment of the present invention as employed for a video file.

As applied to digital files having a video component, either video-only or combined audio and video, the underlying content of one of the first and second versions of the file may only represent a portion of the underlying content of the other file version. For example, a first version may be a ten to thirty second 'trailer' of a motion picture, commonly seen in theaters to promote a soon-to-be released movie. That first version may be compressed with a first codec and downloaded to a customer's mobile station. The corresponding second version may be the entire ninety-plus minute movie, which the customer chooses to download to a TiVo® player or to have streamed directly to a set-top cable box from a cable television provider's server and associated storage array. Such an embodiment is illustrated at FIG. 4, where the customer obtains both versions from a single content provider. FIG. 4 may be adapted for two providers each supplying one of the file versions, similar to that illustrated and described with reference to FIG. 3.

In FIG. 4, a customer accesses a website of a media file provider form a mobile station at block 401. In this example, the underlying content selected by the customer is "movie abc", just as a customer selects in FIG. 3 the underlying content of a music file. The customer selects "mobile phone link" as the link through which he/she wishes to download in this first transaction. An additional confirmation step is preferable since the two file versions of FIG. 4 differ in substance as well as in objective quality as perceived by a customer, so the customer conforms that he/she desires only a movie trailer, such as a fifteen or thirty second video clip. Payment and clickwrap contract are entered as above with reference to FIG. 3.

Being assured payment and contractual protection, at block 402 the media file provider selects a first version of a file that represents the selected movie, which in this instance is termed "movie abc-trailer" to indicate only a portion of the entire underlying movie. This first version is compressed with a first codec that is selected to optimize for downloading over a mobile telephony link. The media file provider associates a digital ticket with the first version of the file.

The customer downloads the first version of the file at block 403, with the accompanying digital ticket, and leaves the media file provider's website at block 404, terminating the first transaction. At block 405, the customer accessed the media file provider's website at a later time to initiate a second transaction, this time from a web-TV browser, a PC, or some other means coupled to a network via a different type of link. The customer enters his/her digital ticket, selects "broadband" or "cable" as the type of link, and confirms that he/she now desires the full movie. Upon verifying the digital ticket presented in this second transaction, at block 406 the media file provider selects the underlying movie from the information contained within that digital ticket, selects the second version of the movie, and allows the customer to access that second version. In this example, the second version is a digitized version of the entire ninety-plus minute movie, entitled "movie abc-full", and is compressed with a second codec that preferably allows greater resolution than the first codec.

The customer downloads at block 407 the second version of the file, and may store it on a PC hard drive, on a removable optical disk loaded in the PC, or in a TiVo player, for example. The customer them leaves the media file provider's website at block 408, terminating the second transaction.

Certain cable television providers are now storing entire movies at storage arrays associated with their network servers. A media file provider may have an agreement with a cable television provider whereby, when the customer accesses the website of the media file provider and makes certain entries (preferably a combination of manual and automatic entries that identify the cable television provider and the customer of the first transaction), he/she is automatically redirected to the website of the cable television provider. The customer need not download and store the second version of the file, which may be a full movie, but may instead have it streamed to him/her from the cable television provider's storage array and servers. While the customer does not 'own' a copy of the second version, DRM may allow him/her access for a limited period of time and/or a limited number of streaming showings of the second version. Both music and video copyright owners now sometimes prevent retail purchasers from acquiring ownership rights in a downloaded digital copy of a copyrighted work. Instead, they license a downloaded copy for finite periods or repetitions, which are automatically enforced by an included DRM code that provides for automatic file corruption or erasure after the license terms have expired. Such DRM licensing rather than ownership of the downloaded copy does not undermine the teachings of the present invention.

Where the example of FIG. 3 entailed an identical underlying file compressed with different codecs, the embodiment of FIG. 4 entails underlying files that are substantively distinguishable. That is, the two file versions of the example of FIG. 4 differ in substance as well as in quality, whereas the two file versions in FIG. 3 preferably differ only in quality due to compression by different codecs. This drives the added (preferred) step in blocks 401 and 405 of the customer confirming which version he/she desires. As used herein, substantively different file versions differ in the content perceived by a reasonable person when the media file is played as intended. File versions whose difference, when played as intended for an intended retail user, is limited only to objectively measurable quality differences, are not substantive differences as that term is used in this application, even if no single line of digital code between the file versions is identical. An important aspect of the present invention is that, when perceived by a user or customer as intended (e.g., the media file is played and perceived audibly and/or visually), the first version and the second version are substantively identical at least in part. Preferably, the substance of one of the versions is a subset of the substance of the other. The embodiment of FIG. 3 may use file versions that are entirely substantively identical. The embodiment of FIG. 4 uses file versions that are substantively identical only in part.

Minor changes to otherwise substantively identical underlying file portions does not substantively de-link the two file versions. For example, the addition of a media file provider's watermark to a movie trailer does not render that watermarked movie trailer substantively non-identical to the entire movie that does not include such a watermark. Such minor changes to a movie trailer constitute a derivative work of the full movie within the rubric of copyright law, but derivative works may be more expansive than such minor changes.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method comprising:
    initiating, by a media file provider server, a presentation of a first type of network link used by a user device connecting to the server and a media file for selection by a customer at the user device;
    receiving, at the server, a selection of the media file from the user device;
    transferring, from the server to the user device, the media file compressed with a first codec that is automatically selected based on the first type of network link, together with a use authorization including an access code;
    detecting, by the server, a second type of network link between the server and a second device that transmits the use authorization; and
    initiating, by the server, a download or streaming of a copy of the media file compressed with a second codec to the second device based on the detecting of the second type of network link, wherein the second codec is automatically selected based on the second type of network link that is different from the first type of network link,
    wherein the first and second types of network links are a mobile telephony wireless link and a wired internet link.

2. The method of claim 1, wherein the use authorization comprises authorization for the customer to download or stream the media file to the second device with no additional payment authorization from the customer, and the access code is automatically uploadable to the second device and then to the server.

3. The method of claim 1, wherein the copy of the media file is provided by another media file service provider that is different from a media file service provider of the server and in agreement with the media file service provider to honor the use authorization.

4. The method of claim 3, further comprising:
    detecting the first type of network link used by the user device using one or more signals embedded in the network link transmitted from the user device; and
    receiving a payment authorization from the customer and enabling remitting a portion of the authorized payment to the another media file service provider.

5. The method of claim 1, further comprising:
    confirming the use authorization; and
    receiving the second type of network link used by the customer.

6. The method of claim 1, wherein the copy of the media file includes digital right management code that performs automatic media file corruption or erasure after a use license term has expired.

7. The method of claim 1, wherein the media file comprises a movie trailer and the copy of the media file comprises a movie which said movie trailer is substantively derived from, and wherein the user device transfers the use authorization via a near field communication connection or a hardwired connection to the second device.

8. A non-transitory computer-readable storage medium carrying one or more sequences of one or more instructions which, when executed by one or more processors, cause an apparatus embedded in a media file provider server to at least perform the following steps:

initiating a presentation of a first type of network link used by a user device connecting to the server and a media file for selection by a customer at the user device;

receiving a selection of the media file from the user device;

transferring, to the user device, the media file compressed with a first codec that is automatically selected based on the first type of network link, together with a use authorization including an access code;

detecting a second type of network link between the server and a second device that transmits the use authorization; and initiating a download or streaming of a copy of the media file compressed with a second codec to the second device based on the detecting of the second type of network link, wherein the second codec is automatically selected based on the second type of network link that is different from the first type of network link, wherein the first and second types of network links are a mobile telephony wireless link and a wired internet link.

9. The method of claim 8, wherein the use authorization is configured as a digital ticket downloaded with the media file.

10. The method of claim 8, wherein the use authorization is received at the second device via a near field communication connection or a hardwired connection.

11. The method of claim 8, wherein the media file and the copy of the media file are substantively identical.

12. The method of claim 8, wherein the media file is a subset of the copy of the media file.

13. The method of claim 12, wherein the media file comprises a movie trailer and the copy of the media file comprises a movie.

14. An apparatus comprising:

at least one processor; and at least one memory including computer program code for one or more programs, the at least one memory and the computer program code configured to, with the at least one processor, cause the apparatus embedded in a media file provider server to perform at least the following:

initiate a presentation of a first type of network link used by a user device connecting to the server and a media file for selection by a customer at the user device;

receive a selection of the media file from the user device;

transfer, to the user device, the media file compressed with a first codec that is automatically selected based on the first type of network link, together with a use authorization including an access code;

detect a second type of network link between the server and a second device that transmits the use authorization; and initiate a download or streaming of a copy of the media file compressed with a second codec to the second device based on the detecting of the second type of network link, wherein the second codec is automatically selected based on the second type of network link that is different from the first type of network link, wherein the first and second types of network links are a mobile telephony wireless link and a wired internet link.

15. The apparatus of claim 14, wherein the use authorization comprises authorization for the customer to download or stream the media file to the second device with no additional payment authorization from the customer, and the access code is automatically uploadable to the second device and then to the server.

16. The apparatus of claim 14, wherein the copy of the media file is provided by another media file service provider that is different from a media file service provider of the server and in agreement with the media file service provider to honor the use authorization.

17. The apparatus of claim 16, wherein the apparatus is further caused to:

detect the first type of network link used by the user device using one or more signals embedded in the network link transmitted from the user device; and receive a payment authorization from the customer and enabling remitting a portion of the authorized payment to the another media file service provider.

18. The apparatus of claim 14, wherein the copy of the media file includes digital right management code that performs automatic media file corruption or erasure after a use license term has expired.

19. The apparatus of claim 14, wherein the media file comprises a movie trailer and the copy of the media file comprises a movie which said movie trailer is substantively derived from, and wherein the user device transfers the use authorization via a near field communication connection or a hardwired connection to the second device.

* * * * *